(12) United States Patent
Griffin

(10) Patent No.: US 9,428,263 B2
(45) Date of Patent: Aug. 30, 2016

(54) FREQUENCY RESPONSE AND HEALTH TRACKER FOR A SYNTHETIC JET GENERATOR

(71) Applicant: The Boeing Company, Seal Beach, CA (US)

(72) Inventor: Steven F. Griffin, Kihei, HI (US)

(73) Assignee: The Boeing Company, Chicago, IL (US)

(*) Notice: Subject to any disclaimer, the term of this patent is extended or adjusted under 35 U.S.C. 154(b) by 308 days.

(21) Appl. No.: 14/055,522

(22) Filed: Oct. 16, 2013

(65) Prior Publication Data

US 2015/0104310 A1    Apr. 16, 2015

(51) Int. Cl.
| | |
|---|---|
| *B64C 21/04* | (2006.01) |
| *B64C 21/08* | (2006.01) |
| *F04B 51/00* | (2006.01) |
| *F04F 7/00* | (2006.01) |
| *F15D 1/00* | (2006.01) |

(52) U.S. Cl.
CPC .............. *B64C 21/04* (2013.01); *B64C 21/08* (2013.01); *F04B 51/00* (2013.01); *F04F 7/00* (2013.01); *F15D 1/0095* (2013.01); *B64C 2230/04* (2013.01); *B64C 2230/06* (2013.01); *B64C 2230/18* (2013.01); *Y02T 50/166* (2013.01)

(58) Field of Classification Search
CPC ....... B64C 21/04; B64C 21/08; B64C 23/06; B64C 23/005; B64C 2230/04; B64C 2700/6274; F15D 1/0095; F04B 43/095; F04B 45/047

USPC ................. 416/1, 13, 61, 23, 90 R, 90 A, 91
See application file for complete search history.

(56) References Cited

U.S. PATENT DOCUMENTS

| | | |
|---|---|---|
| 4,229,939 A | 10/1980 | Smith |
| 4,722,360 A | 2/1988 | Odajima et al. |
| 4,988,015 A | 1/1991 | Price |
| 5,938,404 A | 8/1999 | Domzalski et al. |
| 6,412,732 B1 | 7/2002 | Amitay et al. |
| 6,457,654 B1 | 10/2002 | Glezer et al. |
| 6,821,090 B1 | 11/2004 | Hassan et al. |
| 2006/0181557 A1* | 8/2006 | Hoisington .......... B41J 2/04508 347/11 |
| 2007/0095987 A1 | 5/2007 | Glezer et al. |
| 2007/0205853 A1 | 9/2007 | Taya et al. |
| 2010/0229952 A1 | 9/2010 | Smith et al. |

(Continued)

FOREIGN PATENT DOCUMENTS

| | | |
|---|---|---|
| CA | 2029167 | 6/1991 |
| GB | 2091910 | 8/1982 |

OTHER PUBLICATIONS

Eurpoean Search Report, European Application No. 14188660, dated Mar. 23, 2015.

(Continued)

*Primary Examiner* — Justin Jonaitis
*Assistant Examiner* — Christopher Brunjes
(74) *Attorney, Agent, or Firm* — Perman & Green LLP

(57) ABSTRACT

A jet generator is controlled by providing an input signal at a variable frequency to the jet generator and to a simulated electrical load of the jet generator, measuring a difference in signals between the jet generator and the simulated electrical load to identify an optimum flow of a jet generated by the jet generator, and tuning the frequency of the input signal to maintain the jet at the optimum flow.

20 Claims, 8 Drawing Sheets

(56) References Cited

U.S. PATENT DOCUMENTS

2012/0153041 A1* 6/2012 Ternoy .................... B64C 21/04 239/102.2
2014/0011146 A1* 1/2014 Monson .................... F23J 3/06 432/2

OTHER PUBLICATIONS

Smith, et al., A Comparison between synthetic jets and continuous jets, Experiments in Fluids 34, 2003, pp. 467-472.

You, et al., Study of flow separation over an airfoil with synthetic jet control using large-eddy simulation, Center for Turbulence Research, Annual Research Briefs 2007, pp. 311-321.

Simmers, Jr., et al., Improved Piezoelectric Self-Sensing Actuation, Journal of Intelligent Material Systems and Structures, 15 (12), 941-953, 2004.

Dosch, et al., A Self-Sensing Piezoelectric Actuator for Collocated Control, Journal of Intelligent Material Systems and Structures, vol. 3, Jan. 1992, pp. 167-185.

Griffin, et al., Active Vibroacoustic Device for Noise Reduction in Launch Vehicles, Journal of Spacecraft and Rockets, vol. 45, No. 6, Nov.-Dec. 2008, pp. 1282-1292.

Leo, et al., Microcontroller-Based Implementation of Adaptive Structural Control, SPIE Conference on Smart Structures and Integrated Systems, San Diego, California, Mar. 1998, SPIE vol. 3329, pp. 115-127.

Denoyer, et al., Hybrid structural/acoustic control of a sub-scale payload fairing, SPIE Conference on Smart Structures and Integrated Systems, San Diego, California, Mar. 1998, SPIE vol. 3329, pp. 237-243.

* cited by examiner

FREQUENCY RESPONSE AND HEALTH TRACKER FOR A SYNTHETIC JET GENERATOR

BACKGROUND

1. Field

The exemplary embodiments generally relate to synthetic jets and, more particularly, to driving and monitoring synthetic jet generators.

2. Brief Description of Related Developments

Actuators of a synthetic jet generator are generally driven with a sinusoidal input at a frequency that generates an optimum jet velocity based on the frequency response of the synthetic jet generator. Determining the frequency that results in optimum flow generally requires a calibration routine using an external sensor, for example, an accelerometer. External sensors that have a proper size, noise floor, dynamic range, and robustness for synthetic jet generator applications are generally expensive, typically costing more than the synthetic jet generator itself. The external sensors are generally intrusive and are not conducive to in-situ measurements of the synthetic jet generator.

In the event that the frequency response of the synthetic jet generator shifts, due to structural changes in the generator or environmental conditions, re-characterization of the synthetic jet generator generally requires at least re-attaching an external sensor and re-executing the calibration routine. In certain applications, for example, when the generator is attached to a wing in flight, re-characterization may be prohibited. Furthermore, determining if the synthetic jet generator has degraded and is approaching a failure condition is not feasible without dismantling the generator from its application and returning the generator to a test bed where the external sensor may be attached, and the calibration routine re-executed.

It would be advantageous to be able to characterize a synthetic jet generator without using a calibration routine and a costly external sensor. It would also be advantageous to tune a driving frequency of the synthetic jet generator to maintain the optimum jet velocity, or optimum flow and to determine if the synthetic jet generator is approaching a failure condition.

DETAILED DESCRIPTION

Figure 1:
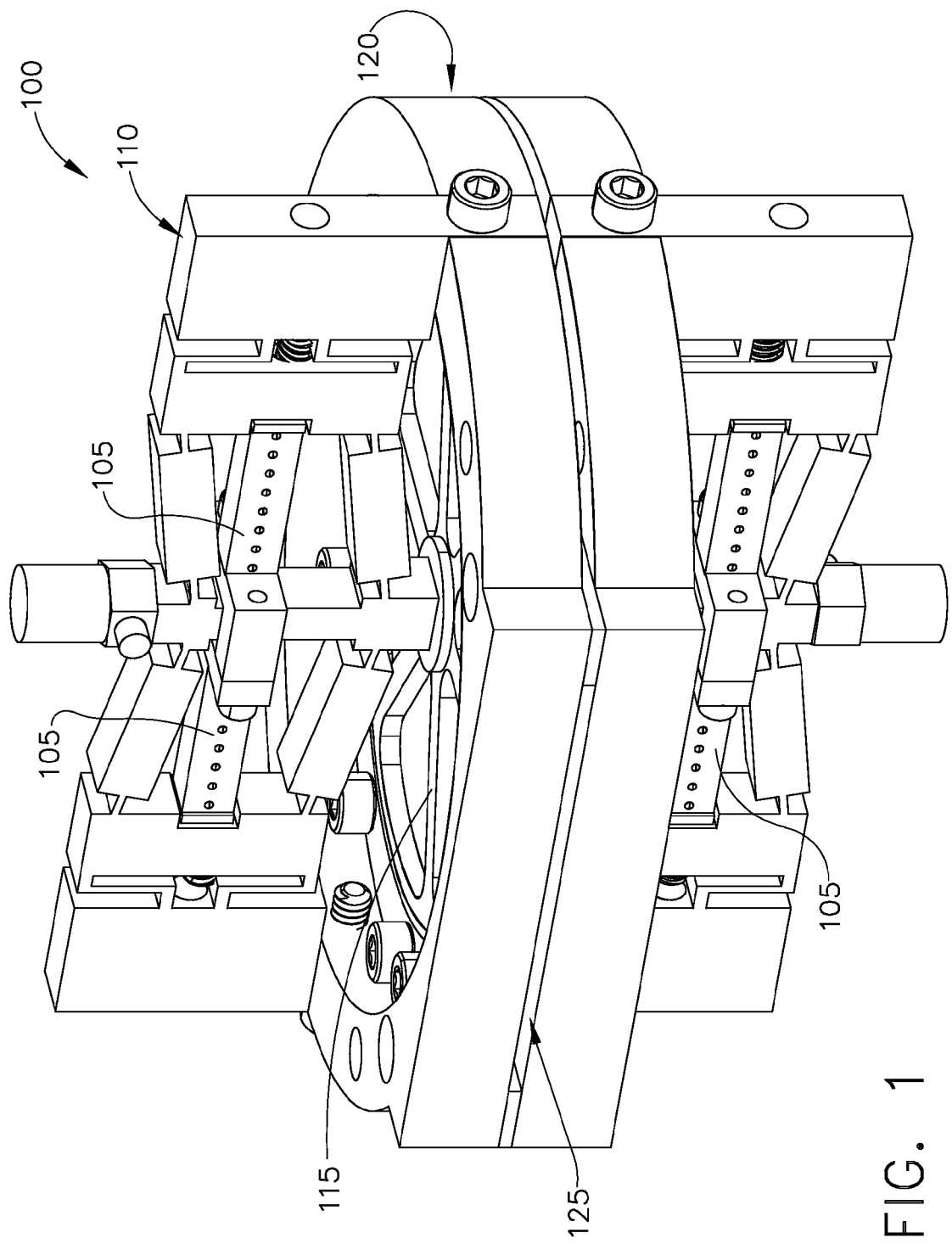
FIG. 1 shows a schematic illustration of a synthetic jet generator in accordance with aspects of the disclosed embodiment.

FIG. 1 shows an exemplary jet generator 100 for use with the disclosed embodiment. The exemplary jet generator operates by moving a fluid back and forth through an opening or aperture. A synthetic jet may be produced by the cyclic suction and expulsion of the fluid from a cavity through the opening by a piston or diaphragm. The exemplary jet generator 100 includes one or more actuators 105, one or more flexures 110, one or more pistons 115, at least one cavity 120 and at least one aperture 125.

In one aspect, the actuator 105 may comprise a piezoelectric or electro-strictive element driven by applying a voltage across the element. In another aspect, the actuator may be made of a stack of piezoelectric or electro-strictive elements driven by applying a voltage across each element of the stack. The piezoelectric or electro-strictive elements may comprise, for example, barium titanite, gallium orthophosphate, lead magnesium niobate, lead lanthanum zirconate titanate, lead titanite, lead zirconate titanite, lithium niobate, lithium tantalite, potassium niobate, or any other suitable material. In yet another aspect, the actuator may be a speaker coil. It should be understood that the exemplary jet generator 100 may include a single actuator or may include multiple actuators. One or more flexures 110 may be coupled to the actuator 105 to amplify the motion of the actuator. The flexure 110 may generally be a mechanical flexure but other motion amplification mechanisms, for example, a servo-mechanism, may also be used. The actuator 105, either alone or in combination with the flexure 110, may drive a piston 115 to displace a fluid, for example air. The piston may be operated as a rigid body or may be periodically bowed, bent, or otherwise deformed to change the volume of the cavity and force the fluid in and out of the cavity 120 through aperture 125. The actuator may be driven with a sinusoidal signal that is determined, based on the behavior of the jet generator 100, to provide optimum jet momentum or velocity, generally referred to as optimum flow. In at least one aspect, the exemplary jet generator 100 may include two opposed flexures respectively coupled to two opposed pistons that operate synchronously to displace fluid in cavity 120 inward and outward through aperture 125.

As mentioned above, an external sensor such as an accelerometer may be used in a calibration routine to identify characteristics of the jet generator 100, for example, a driving frequency that produces an optimum flow. In contrast, according to the disclosed embodiment, the actuator 105 of the jet generator may be used as an in-situ sensor to detect the optimum flow frequency. The actuator 105 may also be used to indicate changes in the optimum flow frequency due, for example, to changes in fluid density, temperature, or other conditions. In addition, the actuator 105 may be used to provide a health assessment to identify approaching failure conditions.

Figure 2:
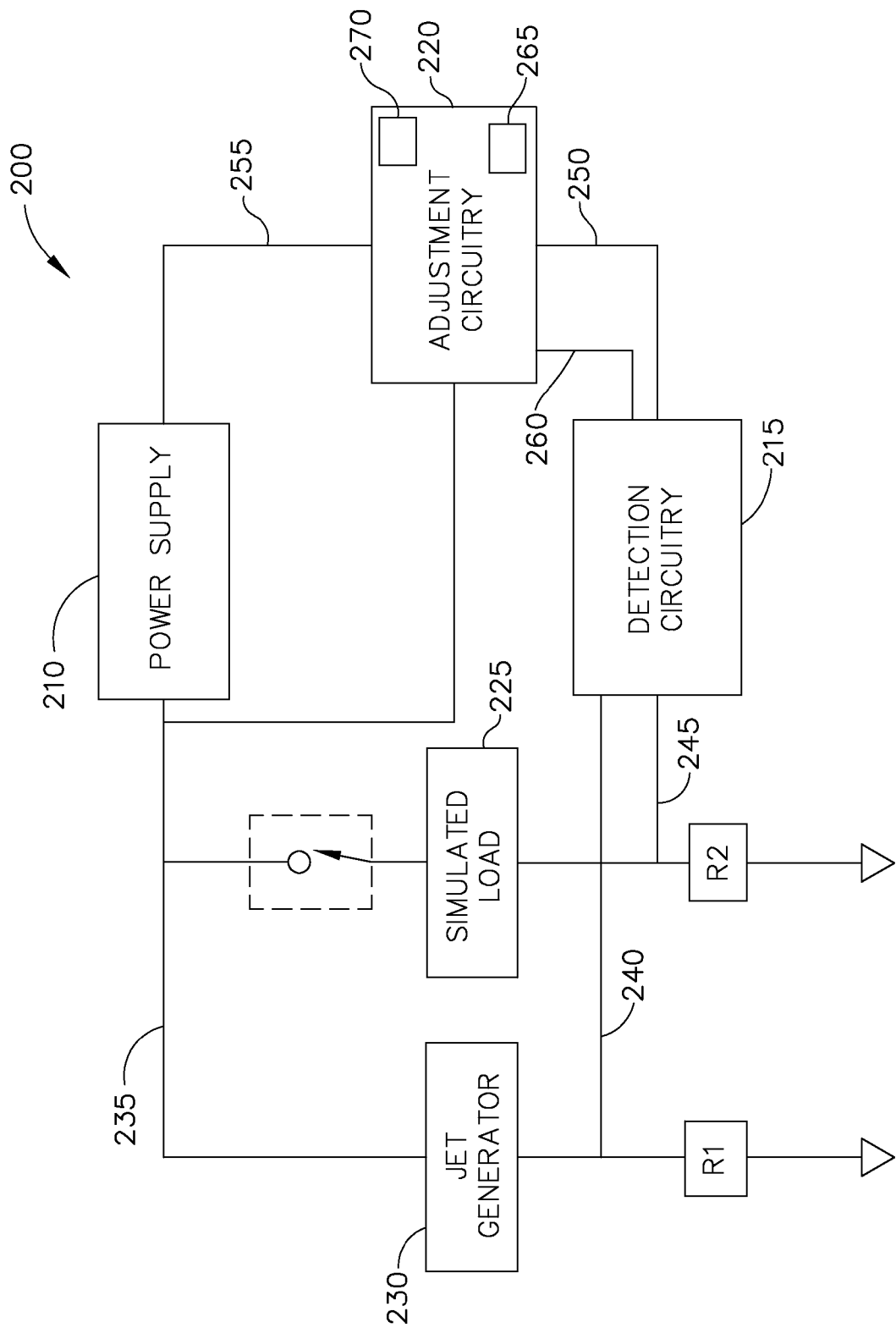
FIG. 2 shows a block diagram of circuitry for characterizing and monitoring performance of a synthetic jet generator in accordance with aspects of the disclosed embodiment.

A block diagram of an apparatus 200 that may be used to characterize and monitor a synthetic jet generator 230 according to the disclosed embodiment is shown in FIG. 2. The apparatus may include a power supply 210, detection circuitry 215, and adjustment circuitry 220. To accomplish self-sensing, an electrical load 225 simulating an electrical load of the jet generator 230 may also be included. Resistors with matching resistances R1, R2 may be provided in series with the jet generator 230 and the simulated load 225, respectively.

It should be understood that power supply 210, detection circuitry 215, and adjustment circuitry 220 may generally include any circuitry or programs for performing the functions described according to the aspects of the disclosed embodiment, including one or more processors, field programmable gate arrays, programmable logic devices, gate array logic devices, state machines, and memory devices. The memory devices may include computer readable or usable media, and computer readable or usable storage media encoded with computer executable components, software, programs, instructions, or commands for implementing the disclosed embodiment. Power supply 210, detection circuitry 215, and adjustment circuitry 220 may also include any suitable sensors, digital signal processors, phase locked loop circuits, buffers, analog to digital and digital to analog converters, level shifters, amplifiers, rectifiers, or any other suitable electrical components for performing the functions described herein.

It should also be understood that, while the power supply 210, detection circuitry 215, and adjustment circuitry 220 are described separately, they may be incorporated into a single element or their functions and circuitry may be distributed across any number of hardware or software elements.

The power supply 210 may provide an input signal 235 to the jet generator 230 and to the simulated electrical load 225. The power supply may use a bridge circuit to drive the jet generator 230 and the simulated load 225, or any suitable drive circuit that provides the voltage, currents, and slew rates required to drive the jet generator 230 and the simulated load 225. In one aspect, the input signal 235 may have a single frequency and the power supply may vary the frequency to produce an optimum flow according to control parameters provided by adjustment circuitry 220. In at least one aspect, the jet generator 230 produces the optimum flow when the input signal 235 causes the jet generator 230 to operate at a resonant frequency of the jet generator.

It should be noted that the simulated load 225 may be selectively disconnected from signal 235 in order to reduce an amount of power required by the power supply 210 and may be connected when required for characterization and monitoring of the jet generator 230.

In one aspect, the detection circuitry 215 may be connected to the jet generator 230 and may be arranged to determine a frequency of a signal 240 through the jet generator 230 and provide an output signal 260 indicative of the frequency. The adjustment circuitry 220 may sense output signal 260 and provide control parameters 255 to the power supply 210 for tuning the variable frequency of the power supply so that the input signal 235 causes the jet generator to maintain the optimum flow. In one exemplary aspect, adjustment circuitry 220 may include a microcontroller implemented adaptive feedback algorithm 270 that uses a phase locked loop circuit to compare input signal 235 and output signal 260 to track a resonant frequency of jet generator 230 and provide control parameters 255 to the power supply 210 for tuning the variable frequency of the power supply so that the input signal 235 causes the jet generator to operate at a resonant frequency to maintain the optimum flow. In other aspects, any circuitry suitable for monitoring variations in a resonant frequency of the jet generator and providing control parameters to the power supply to maintain the jet generator operation at the optimum flow may be utilized.

Figure 3A:
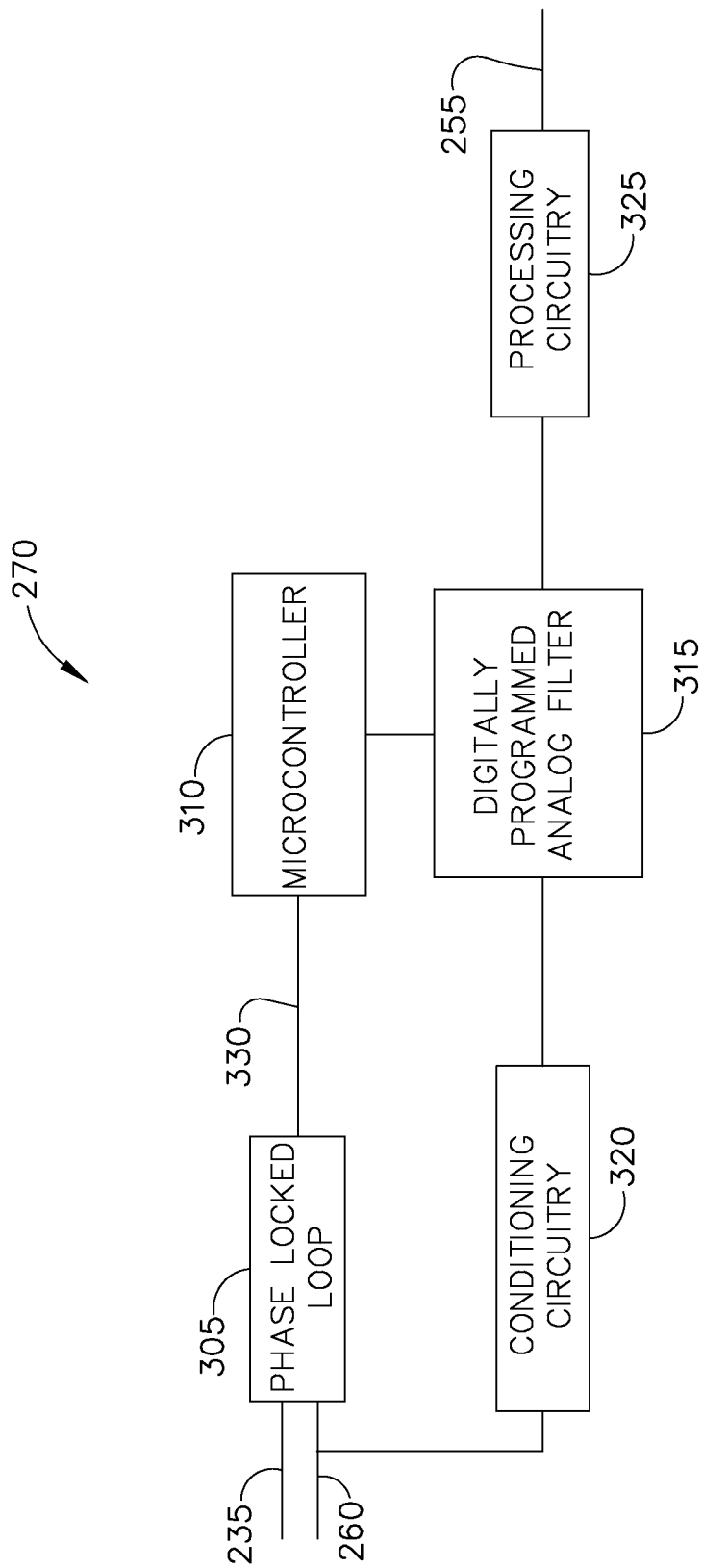
FIG. 3A shows a block diagram of an exemplary microcontroller executed adaptive feedback algorithm in accordance with aspects of the disclosed embodiment.

FIG. 3A shows a block diagram of an exemplary implementation of the microcontroller executed adaptive feedback algorithm 270, including a phase lock loop circuit 305, a microcontroller 310, a digitally programmed analog filter 315, conditioning circuitry 320 and processing circuitry 325. In one aspect, the phase locked loop circuit 305 and digitally programmed analog filter 315 may be used to effect a tuned second order control system for tracking an operating frequency of the synthetic jet generator. The phase locked loop circuit 305 may be used to compare signals 235 and 260 and provide a signal 330 proportional to the difference between signals 235 and 260 to microcontroller 310. Microcontroller 310 may analyze the proportional signal 330 to set filter parameters for the digitally programmed analog filter 315. In one aspect, digitally programmed analog filter 315 may be a switched capacitor filter with a switching frequency set by signal 260 as conditioned by conditioning circuitry 320. The output of the digitally programmed analog filter 315 may then be filtered or further processed by processing circuitry 325 to provide the control parameters 255 for power supply 235

In another aspect, the detection circuitry 215 may be connected to the jet generator 230 and the simulated load and may be arranged to measure a difference between the signal 240 through the jet generator 230 and signal 245 through the simulated load 225. The detection circuitry 215 may provide an output signal 250 to the adjustment circuitry 220 that is proportional to the difference between the signals 240, 245. In one aspect, the output signal 250 is indicative of a difference in current through the jet generator 230 and the simulated load 225. In another aspect, an electrical load of the jet generator 230 and the simulated electrical load are both substantially capacitive. In yet another aspect, for example, when the jet generator uses a speaker coil as an actuator, the electrical load of the jet generator 230 and the simulated electrical load may both be substantially inductive. In both aspects, the output signal 250 may indicate an amount of current used to actuate the jet generator 230

The adjustment circuitry 220 may include calculation circuitry 265 for determining a transfer function from the input signal and the difference in signals between the jet generator and the simulated load represented by output signal 250 over an operating frequency range of the synthetic jet generator.

Figure 3B:
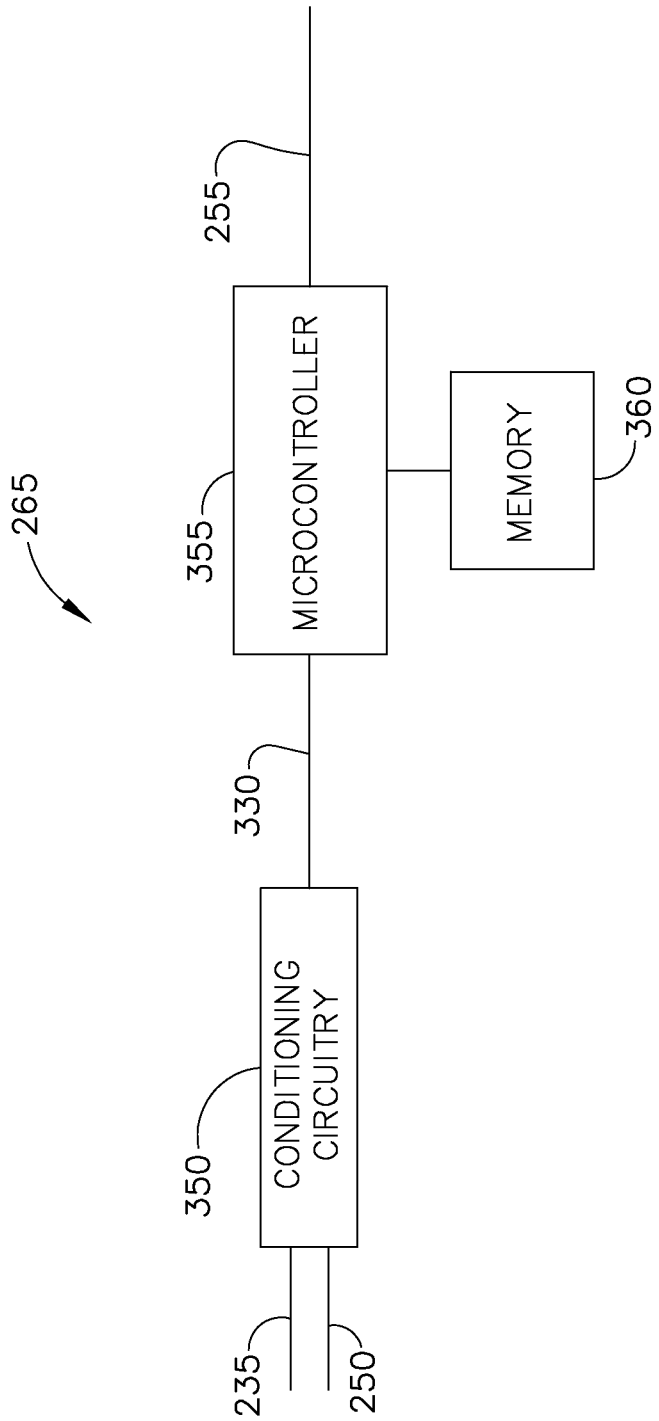
FIG. 3B shows a block diagram of exemplary calculation circuitry in accordance with aspects of the disclosed embodiment.
Figure 4:
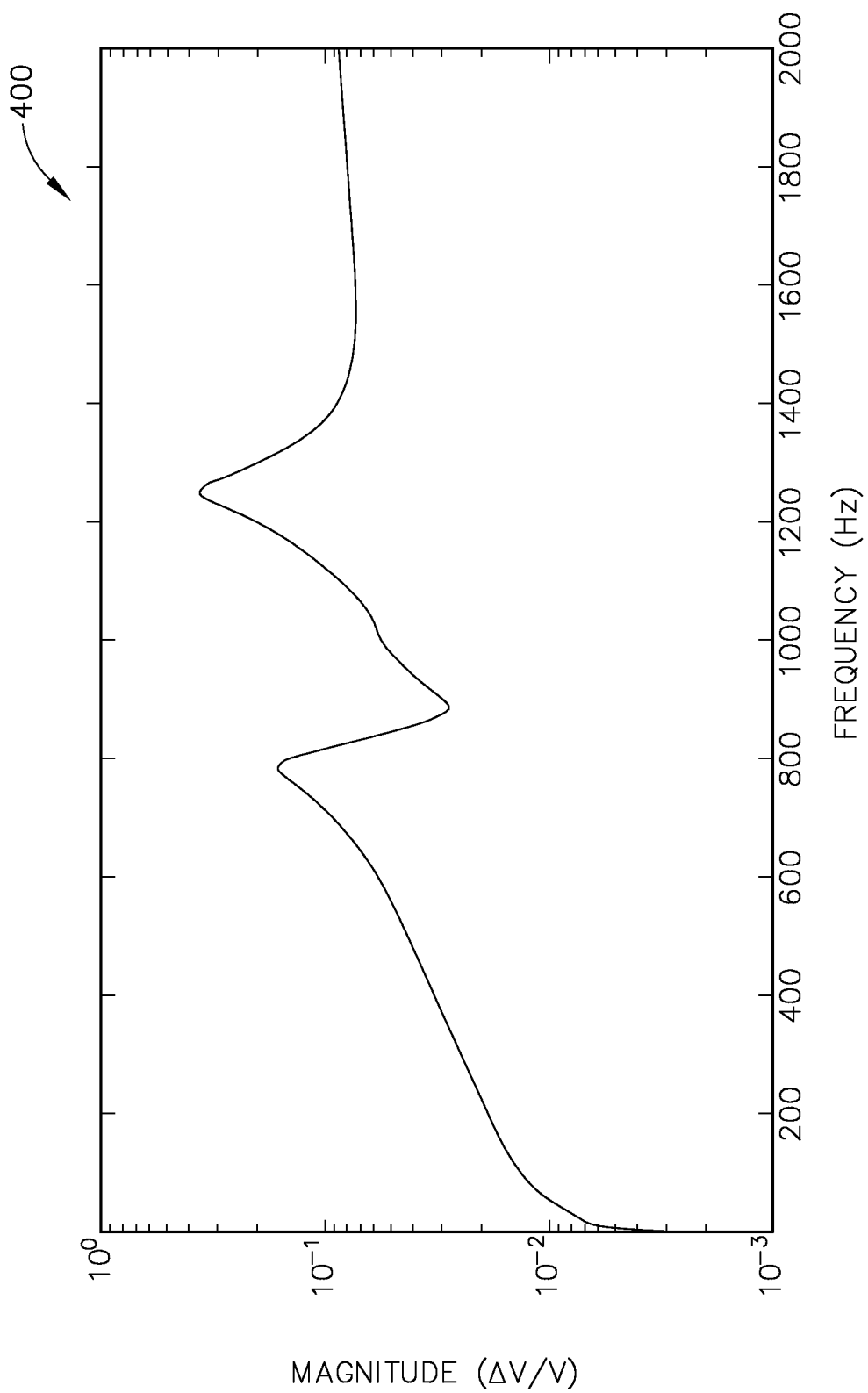
FIG. 4 shows an exemplary transfer function of a synthetic jet generator in accordance with aspects of the disclosed embodiment.

FIG. 3B shows a block diagram of an example of calculation circuitry 265 for determining and utilizing a transfer function. In at least one aspect, calculation circuitry includes signal conditioning circuitry 350, a microcontroller 355, and a memory device 360. Calculation circuitry 265, under control of the microcontroller 355 may provide control parameters 255 that cause the power supply 210 to vary a frequency of the input signal over an operating frequency range of the jet generator 230. As the frequency varies, the microcontroller may store data representing the difference in signals between the jet generator and the simulated load, provided by output signal 250 and conditioned by conditioning circuitry 350, in memory 360. The microcontroller 355 may use the data to calculate a transfer function of the differenced signal 250 over the input signal 235 for selected intervals over the operating frequency range of the jet generator 230. An exemplary transfer function is shown in FIG. 4. The transfer function 400 may be analyzed by the microcontroller 355 to identify one or more resonant frequencies of the jet generator 230 at which the jet generator 230 produces an optimum flow, and the microcontroller 355 may generate control parameters for the power supply 210 to operate the jet generator 230 at an optimum flow at one of the resonant frequencies. In at least one aspect, the adjustment circuitry may implement a feedback system to operate the synthetic jet generator 230 at the optimum flow.

It should be understood that the transfer function may also be determined independently of the systems described herein, for example, by independent measurement on a separate test bed, by independent calculations on other systems, by modeling on other systems, or by any process suitable for determining a transfer function describing the operation of the synthetic jet generator.

The microcontroller 355 may also include circuitry for identifying changes in the transfer function corresponding to changes in the one or more resonant frequencies of the jet generator 230 caused by, for example, changes in environmental conditions such as fluid density and temperature. In response, the microcontroller 355 may generate control parameters 255 for the power supply 210 to change a frequency of signal 235 as a resonant frequency of the jet generator 230 changes so that jet generator 230 continues to produce an optimum flow.

Figure 5:
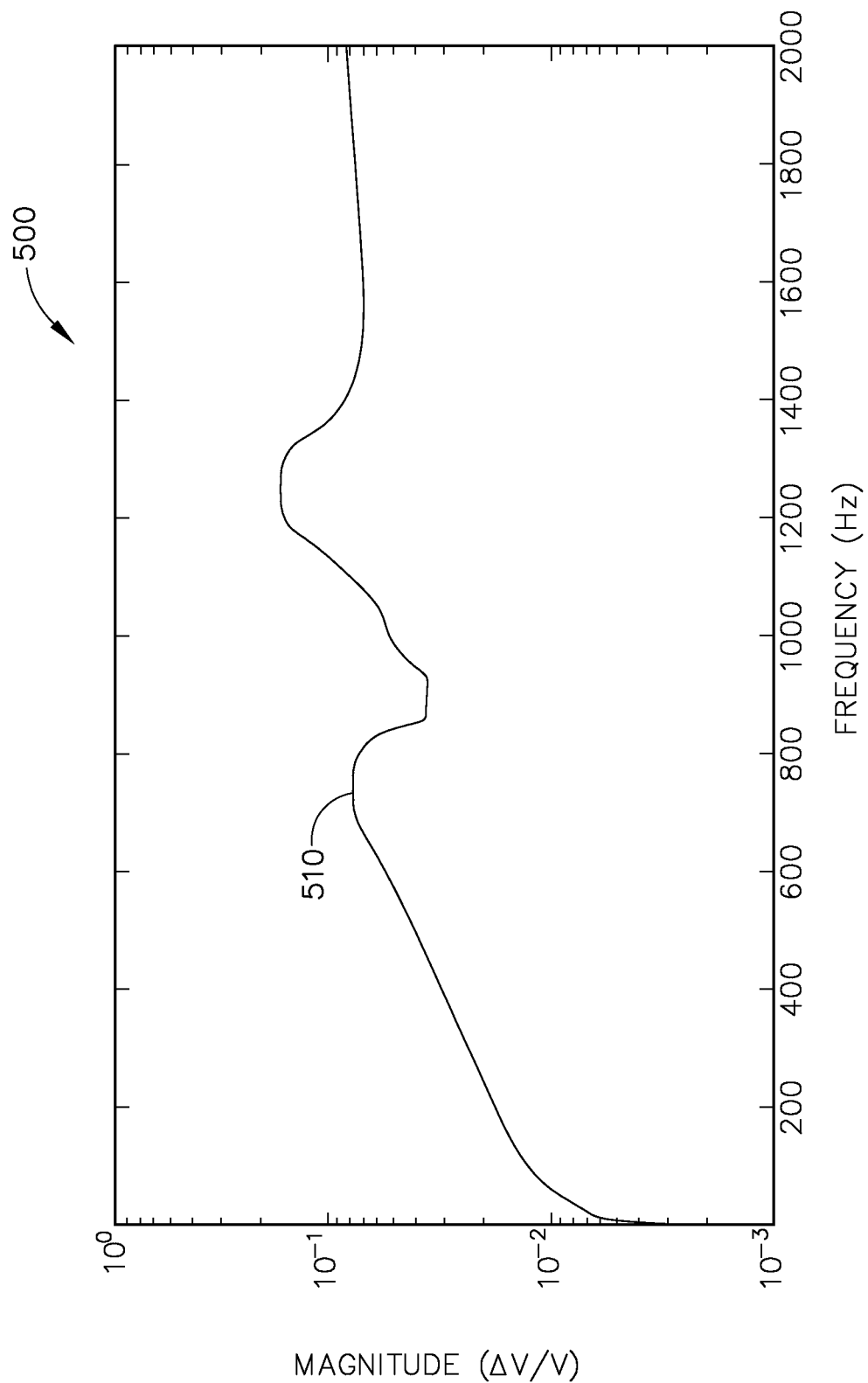
FIG. 5 shows another exemplary transfer function of a synthetic jet generator in accordance with aspects of the disclosed embodiment.

The adjustment circuitry 220 may also include circuitry for determining an indication of the health of the jet generator 230 from changes in the transfer function. As an example, FIG. 5 shows a transfer function 500 originally illustrated in FIG. 4 but with clipped peaks 510. Particular variations in the transfer function may identify approaching failure conditions, for example, a damaged flexure or actuator with a limited range of motion. In this example, the flexure or actuator may continue to operate but with reduced effectiveness. The adjustment circuitry may provide control parameters to the power supply to maintain the original transfer function, or provide control parameters to the power supply to operate the jet generator at a reduced capacity until the jet generator may be serviced.

In at least one aspect, the stored data may be used to calculate a back electromotive force (emf) signature of the jet generator actuator, for example, where the jet generator uses a speaker coil as an actuator. The detection circuitry in combination with the adjustment circuitry may be configured to determine the health indicator as a function of changes in the back emf signature. Deviations in the back emf may provide an indication of approaching failure conditions, and in response, the adjustment circuitry may provide control parameters to the power supply to maintain the jet generator at the optimum flow, or may provide control parameters to the power supply to operate the jet generator at a reduced capacity.

It should be understood that the back emf signature may also be determined independently of the systems described herein, for example, by independent measurement on a separate test bed, by independent calculations on other systems, by modeling on other systems, or by any process suitable for determining the back emf of the synthetic jet generator over the operating frequency range.

The adjustment circuitry may optionally send an alert of a pending failure to a user or to an external system, or may provide control parameters to the power supply causing the power supply to send the alert.

Figure 6:
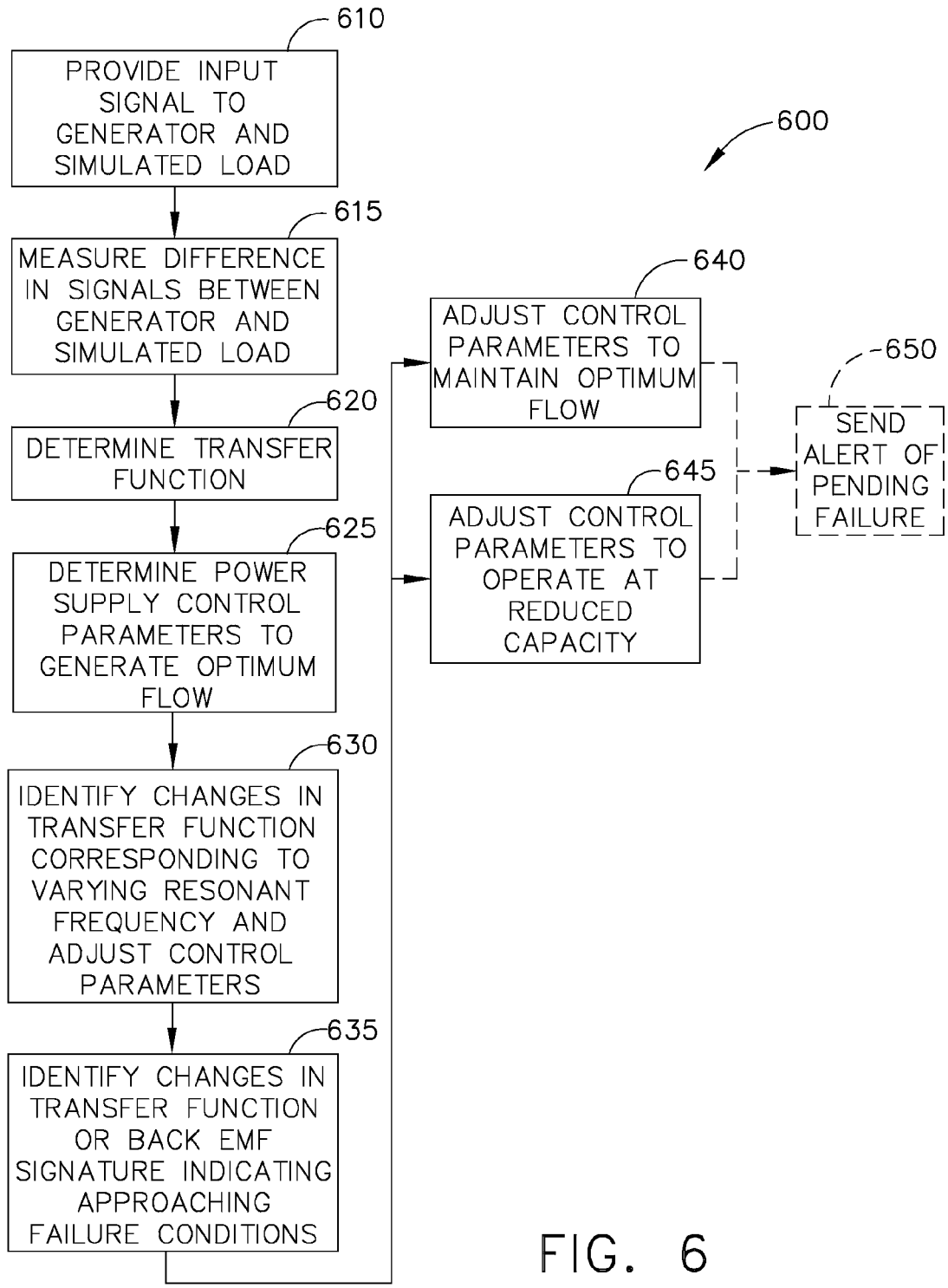
FIG. 6 shows a procedure for characterizing and monitoring performance of a synthetic jet generator in accordance with aspects of the disclosed embodiment.

FIG. 6 shows a procedure 600 for characterizing and monitoring performance of a synthetic jet generator in accordance with aspects of the disclosed embodiment. In block 610 an input signal is provided to the jet generator 230 and the simulated load 225 over an operating frequency range of the jet generator 230. In block 615, a difference in signals between the jet generator and the simulated electrical load is measured over the operating frequency range of the jet generator 230. In block 620, a transfer function is determined from the input signal and the difference in signals between the jet generator and the simulated electrical load. In block 625, the transfer function is used to determine control parameters for the input signal to cause the synthetic jet to generate an optimum flow. In block 630, changes in the transfer function corresponding to a varying resonant frequency of the jet generator 230 are identified and the control parameters are adjusted to vary a frequency of the input signal so that the jet generator 230 operates at the varying resonant frequency to produce the optimum flow. In block 635, changes in the transfer function or back emf signature that may identify approaching failure conditions are recognized and in block 640, the control parameters are adjusted to maintain the jet generator 230 at the optimum flow. Alternately, in block 645, the control parameters are adjusted to operate the jet generator at a reduced capacity until the jet generator may be serviced. Optionally, in block 650, an alert of a pending failure may be sent to a user or to an external system.

Figure 7:
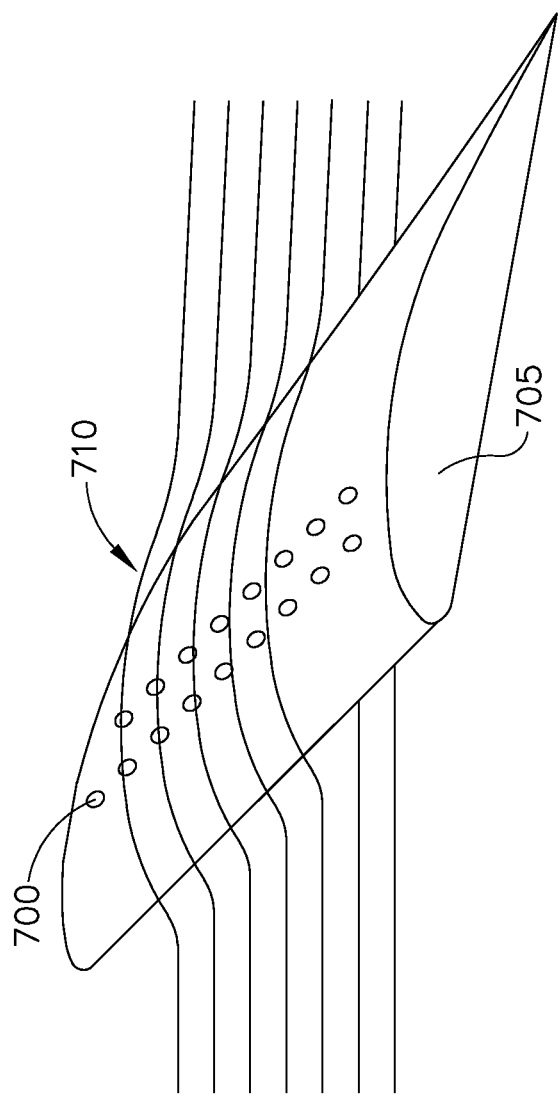
FIG. 7 shows a schematic diagram of one or more synthetic jets used in combination with an airfoil in accordance with aspects of the disclosed embodiment.

FIG. 7 shows a schematic diagram of an exemplary aspect of the disclosed embodiment where one or more synthetic jets 700 may be used in combination with an airfoil 705 to achieve active flow control. For example, the one or more synthetic jets 700 may be used to control flow separation by adding or subtracting energy from a fluid boundary layer 710. In particular, the one or more synthetic jets 700 may be used to decrease drag by suppressing flow separation or shedding in order to prevent leading edge stall at high angles of attack. It should be understood that the one or more synthetic jets shown in FIG. 7 may be characterized, monitored, and controlled by circuitry as exemplified in apparatus 200 described above. It should also be understood that the locations, arrangement and number of synthetic jets in FIG. 7 are shown as examples only and that any suitable configuration and quantity may be utilized An exemplary airfoil with synthetic jets is shown in U.S. Pat. No. 5,938,404, incorporated by reference in its entirety.

In accordance with one or more aspects of the disclosed embodiment, an apparatus includes a power supply for providing an input signal at a variable frequency to a jet generator effecting a jet and to a simulated electrical load of the jet generator, detection circuitry for measuring a difference in signals between the jet generator and the simulated electrical load to effect an optimum flow of the jet, and adjustment circuitry for tuning the variable frequency of the power supply to maintain the jet at the optimum flow.

In accordance with one or more aspects of the disclosed embodiment, the adjustment circuitry is configured to determine a transfer function from the input signal and the difference in signals between the jet generator and the simulated electrical load over a frequency range, for determining control parameters for tuning the variable frequency of the power supply.

In accordance with one or more aspects of the disclosed embodiment, the adjustment circuitry is configured to distinguish alterations in the transfer function indicating degradation of the jet generator.

In accordance with one or more aspects of the disclosed embodiment, the jet generator produces the optimum flow at a resonant frequency of the jet generator.

In accordance with one or more aspects of the disclosed embodiment, the jet generator comprises a synthetic jet.

In accordance with one or more aspects of the disclosed embodiment, the jet generator comprises a piezo-electric device.

In accordance with one or more aspects of the disclosed embodiment, the jet generator comprises an electro-strictive device.

In accordance with one or more aspects of the disclosed embodiment, the jet generator comprises a speaker coil.

In accordance with one or more aspects of the disclosed embodiment, a control system includes a power supply for providing power at a variable frequency to a jet generator effecting a jet and to a simulated electrical load of the jet generator, detection circuitry for measuring a difference in current through the jet generator and simulated electrical load to effect an optimum flow of the jet, and adjustment circuitry for tuning the variable frequency of the power supply to maintain the jet at the optimum flow.

In accordance with one or more aspects of the disclosed embodiment, the control system includes calculation circuitry for determining a transfer function from the power and the difference in current between the jet generator and simulated electrical load over a frequency range, for determining control parameters for the adjustment circuitry.

In accordance with one or more aspects of the disclosed embodiment, the calculation circuitry is configured to distinguish alterations in the transfer function indicating degradation of the jet generator.

In accordance with one or more aspects of the disclosed embodiment, the jet generator produces the optimum flow at a resonant frequency of the jet generator.

In accordance with one or more aspects of the disclosed embodiment, the jet generator comprises a synthetic jet.

In accordance with one or more aspects of the disclosed embodiment, a method of controlling a jet generator includes providing an input signal at a variable frequency to the jet generator and to a simulated electrical load of the jet generator, measuring a difference in signals between the jet generator and the simulated electrical load to effect an optimum flow of a jet generated by the jet generator, and tuning the frequency of the input signal to maintain the jet at the optimum flow.

In accordance with one or more aspects of the disclosed embodiment, the method includes determining a transfer function from the input signal and the difference in signals between the jet generator and the simulated electrical load to determine control parameters for tuning the variable frequency of the input signal.

In accordance with one or more aspects of the disclosed embodiment, the method includes distinguishing alterations in the transfer function indicating degradation of the jet generator.

In accordance with one or more aspects of the disclosed embodiment, the jet generator produces the optimum flow at a resonant frequency of the jet generator.

In accordance with one or more aspects of the disclosed embodiment, the jet generator comprises a synthetic jet.

In accordance with one or more aspects of the disclosed embodiment, the jet generator comprises a piezo-electric device.

In accordance with one or more aspects of the disclosed embodiment, the jet generator comprises an electro-strictive device.

In accordance with one or more aspects of the disclosed embodiment, the jet generator comprises a speaker coil.

In accordance with one or more aspects of the disclosed embodiment, a method of characterizing and monitoring performance of a synthetic jet generator includes providing an input signal to the synthetic jet generator and to a simulated electrical load of the synthetic generator over an operating frequency range of the synthetic jet generator, measuring a difference in signals between the jet generator and the simulated electrical load over the operating frequency range, determining a transfer function from the input signal and the difference in signals between the jet generator and the simulated electrical load, and using the transfer function to determine control parameters for the input signal to cause the synthetic jet generator to generate an optimum flow.

In accordance with one or more aspects of the disclosed embodiment, the method includes identifying changes in the transfer function corresponding to a varying resonant frequency of the synthetic jet generator; and In accordance with one or more aspects of the disclosed embodiment, the method includes adjusting the control parameters to change a frequency of the input signal to cause the synthetic jet generator to operate at the varying resonant frequency to generate the optimum flow.

In accordance with one or more aspects of the disclosed embodiment, the method includes detecting a variation from the transfer function signifying an approaching failure condition and adjusting the control parameters to maintain the synthetic jet generator at the optimum flow or adjusting the control parameters to operate the synthetic jet generator at a reduced capacity.

In accordance with one or more aspects of the disclosed embodiment, the method includes sending an alert of the approaching failure condition.

In accordance with one or more aspects of the disclosed embodiment, the method includes measuring a difference in signals between the jet generator and the simulated electrical load over the operating frequency range to determine a back emf signature of the jet generator, detecting a variation from the back emf signature signifying an approaching failure condition, and adjusting the control parameters to maintain the synthetic jet generator at the optimum flow or adjusting the control parameters to operate the synthetic jet generator at a reduced capacity.

In accordance with one or more aspects of the disclosed embodiment, the method includes sending an alert of the approaching failure condition.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An apparatus comprising:
  a power supply for providing an input signal at a variable frequency to a jet generator effecting a synthetic jet and to a simulated electrical load of the jet generator;
  detection circuitry for measuring a difference in signals between the jet generator and the simulated electrical load to effect an optimum flow of the synthetic jet; and
  adjustment circuitry for tuning the variable frequency of the power supply to maintain the synthetic jet at the optimum flow.

2. The apparatus of claim 1, wherein the adjustment circuitry is configured to determine a transfer function from the input signal and the difference in signals between the jet generator and the simulated electrical load over a frequency range, for determining control parameters for tuning the variable frequency of the power supply.

3. The apparatus of claim 2, wherein the adjustment circuitry is configured to distinguish alterations in the transfer function indicating degradation of the jet generator.

4. The apparatus of claim 1, wherein the jet generator produces the optimum flow at a resonant frequency of the jet generator.

5. The apparatus of claim 1, wherein the jet generator comprises a piezo-electric device.

6. The apparatus of claim 1, wherein the jet generator comprises an electro-strictive device.

7. The apparatus of claim 1, wherein the jet generator comprises a speaker coil.

8. A method of controlling a jet generator comprising:
providing an input signal at a variable frequency to the jet generator and to a simulated electrical load of the jet generator;
measuring a difference in signals between the jet generator and the simulated electrical load to effect an optimum flow of a synthetic jet generated by the jet generator; and
tuning the frequency of the input signal to maintain the synthetic jet at the optimum flow.

9. The method of claim 8, further comprising determining a transfer function from the input signal and the difference in signals between the jet generator and the simulated electrical load to determine control parameters for tuning the variable frequency of the input signal.

10. The method of claim 9, further comprising distinguishing alterations in the transfer function indicating degradation of the jet generator.

11. The method of claim 8, wherein the jet generator produces the optimum flow at a resonant frequency of the jet generator.

12. The method of claim 8, wherein the jet generator comprises a piezo-electric device.

13. The method of claim 8, wherein the jet generator comprises an electro-strictive device.

14. The method of claim 8, wherein the jet generator comprises a speaker coil.

15. A method of characterizing and monitoring performance of a synthetic jet generator comprising:
providing an input signal to the synthetic jet generator and to a simulated electrical load of the synthetic generator over an operating frequency range of the synthetic jet generator;
measuring a difference in signals between the jet generator and the simulated electrical load over the operating frequency range;
determining a transfer function from the input signal and the difference in signals between the jet generator and the simulated electrical load; and
using the transfer function to determine control parameters for the input signal to cause the synthetic jet generator to generate an optimum flow.

16. The method of claim 15 comprising:
identifying changes in the transfer function corresponding to a varying resonant frequency of the synthetic jet generator; and
adjusting the control parameters to change a frequency of the input signal to cause the synthetic jet generator to operate at the varying resonant frequency to generate the optimum flow.

17. The method of claim 15 further comprising:
detecting a variation from the transfer function signifying an approaching failure condition; and
adjusting the control parameters to maintain the synthetic jet generator at the optimum flow or adjusting the control parameters to operate the synthetic jet generator at a reduced capacity.

18. The method of claim 17 further comprising sending an alert of the approaching failure condition.

19. The method of claim 17 further comprising sending an alert of the approaching failure condition.

20. The method of claim 15 further comprising:
measuring a difference in signals between the jet generator and the simulated electrical load over the operating frequency range to determine a back emf signature of the jet generator;
detecting a variation from the back emf signature signifying an approaching failure condition; and
adjusting the control parameters to maintain the synthetic jet generator at the optimum flow or adjusting the control parameters to operate the synthetic jet generator at a reduced capacity.

* * * * *